US009863557B2

United States Patent
Haynes et al.

(10) Patent No.: US 9,863,557 B2
(45) Date of Patent: Jan. 9, 2018

(54) ESCUTCHEON (71) Applicant: Lake Products Limited, Rosedale, Auckland (NZ)

(72) Inventors: Andrew Leo Haynes, Auckland (NZ); Christopher Charles Morrow, Auckland (NZ); Michael John Sumner, Auckland (NZ)

(73) Assignee: Lake Products Limited, Auckland (NZ)

( * ) Notice: Subject to any disclaimer, the term of this patent is extended or adjusted under 35 U.S.C. 154(b) by 491 days.

(21) Appl. No.: 14/381,441

(22) PCT Filed: Mar. 4, 2013

(86) PCT No.: PCT/NZ2013/000029
§ 371 (c)(1),
(2) Date: Aug. 27, 2014

(87) PCT Pub. No.: WO2013/129948
PCT Pub. Date: Sep. 6, 2013

(65) Prior Publication Data
US 2015/0083236 A1 Mar. 26, 2015

(30) Foreign Application Priority Data
Mar. 2, 2012 (NZ) ........................................ 598551

(51) Int. Cl.
*F16L 5/10* (2006.01)
*H02G 3/22* (2006.01)

(52) U.S. Cl.
CPC .................. *F16L 5/10* (2013.01); *H02G 3/22* (2013.01); *Y10T 137/6977* (2015.04)

(58) Field of Classification Search
CPC ........................................................ H02G 3/02
(Continued)

(56) References Cited

U.S. PATENT DOCUMENTS 353,505 A * 11/1886 Rollins ...................... F16L 5/00
126/317
880,302 A * 2/1908 Heineman ............... F16L 19/14
172/604

(Continued)

FOREIGN PATENT DOCUMENTS

AU   2000/042690 A1   1/2001
DE   38 12 690         8/1989
(Continued)

OTHER PUBLICATIONS

Written Opinion regarding International Appl. No. PCT/NZ2013/000029, dated Jul. 30, 2013, 6 pages.
(Continued)

Primary Examiner — David Bochna
(74) Attorney, Agent, or Firm — Foley & Lardner LLP (57) ABSTRACT

An escutcheon or wall flange to receive a pipe, conduit, cable or like member has an outer periphery, and an inner periphery or a definable inner periphery to bear on the intended pipe. The escutcheon or flange is of a flexible material limited as to its flex outwardly of the inner periphery, or definable inner periphery, by a profile feature and/or a thickness increase. The escutcheon may also be of a flexible material limited as to its flex outwardly in the radial direction of the inner periphery by a profile feature of the face to be concealed in use or profile features of the face to be concealed in use. The escutcheon may also include one or more sacrificial or tear away portions for accommodating different sized pipe.

25 Claims, 8 Drawing Sheets

(58) Field of Classification Search
USPC .................................. 285/4, 46; 137/359
See application file for complete search history.

(56) References Cited

U.S. PATENT DOCUMENTS

| | | | | | |
|---|---|---|---|---|---|
| 1,201,349 | A | * | 10/1916 | Rosenfeld | F16L 5/00 126/317 |
| 1,229,061 | A | * | 6/1917 | Gaynor | F16L 5/00 126/317 |
| 1,258,884 | A | * | 3/1918 | Fife | E04D 13/1476 285/12 |
| 1,335,730 | A | * | 4/1920 | Gaynor | 126/317 |
| 1,539,371 | A | * | 5/1925 | Scott et al. | F16L 5/00 126/317 |
| 1,904,681 | A | * | 4/1933 | Frantz | F16L 5/00 126/317 |
| 2,244,939 | A | * | 6/1941 | Carlson | F16J 15/3228 277/606 |
| 2,594,843 | A | * | 4/1952 | Barfus | F16L 5/00 126/317 |
| 2,985,465 | A | * | 5/1961 | Church | E04D 13/1476 285/238 |
| 3,098,663 | A | * | 7/1963 | Dibley | E04D 13/1471 285/43 |
| 3,615,108 | A | * | 10/1971 | Toth | F16L 5/00 138/89 |
| 3,691,839 | A | * | 9/1972 | Lasher | G01F 23/76 116/228 |
| 3,731,952 | A | * | 5/1973 | Elwart | E04D 13/1476 285/3 |
| 3,881,752 | A | * | 5/1975 | Fujishima | F16L 5/10 285/46 |
| 3,964,549 | A | * | 6/1976 | McGill | A62C 37/10 285/46 |
| 4,211,423 | A | * | 7/1980 | Resech | E04D 13/1407 285/42 |
| 4,385,777 | A | * | 5/1983 | Logsdon | F16L 5/10 285/46 |
| 4,407,023 | A | * | 10/1983 | Norton | E03C 1/042 285/46 |
| 4,770,251 | A | * | 9/1988 | Sweet | A62C 37/10 285/46 |
| 5,036,636 | A | * | 8/1991 | Hasty | E04D 13/1476 285/42 |
| 5,176,408 | A | * | 1/1993 | Pedersen | E04D 13/1476 285/44 |
| 5,222,334 | A | * | 6/1993 | Hasty | E04D 13/1476 285/4 |
| 5,309,579 | A | * | 5/1994 | Nelson | E03D 11/16 285/46 |
| 5,588,267 | A | * | 12/1996 | Rodriguez | E04D 13/1476 285/4 |
| 6,752,176 | B1 | * | 6/2004 | Price | F16L 59/166 285/47 |
| 7,197,777 | B2 | * | 4/2007 | Ismert | F16L 5/10 4/252.1 |
| 7,814,709 | B1 | * | 10/2010 | Resech | E04D 13/1407 52/100 |
| 8,608,206 | B2 | * | 12/2013 | Fedale, Sr. | E04D 13/1407 285/4 |
| 9,169,648 | B1 | * | 10/2015 | Mills | E04D 13/1476 |
| 2008/0211226 | A1 | | 9/2008 | Whitney | |
| 2011/0094165 | A1 | * | 4/2011 | McDow, Jr. | E04D 13/1476 52/58 |
| 2011/0186142 | A1 | | 8/2011 | Klein | |

FOREIGN PATENT DOCUMENTS

| | | |
|---|---|---|
| DE | 40 06 760 | 6/1991 |
| EP | 1074776 A1 | 2/2001 |
| EP | 2360063 A1 | 8/2011 |

OTHER PUBLICATIONS

Australian Office Action on Australian Application No. 2013201239 dated Jul. 17, 2015, 7 pages.
Australian Office Action on Australian Application No. 2013201239 dated Jun. 25, 2014, 5 pages.
New Zealand Office Action on New Zealand Application No. 607821 dated Mar. 8, 2013, 3 pages.
New Zealand Office Action on New Zealand Application No. 607821 dated Sep. 5, 2014, 2 pages.

* cited by examiner

FIGURE 1

PRIOR ART

ESCUTCHEON

FIELD OF THE INVENTION

The present invention relates to escutcheons or flanges of a kind to receive a pipe, conduit, cable or the like member, related assemblies, procedures, methods and outcomes.

BACKGROUND OF THE INVENTION

Such flanges or escutcheons will now be described with reference to plumbing needs as an example.

Pipes used in plumbing applications come in a variety of types and have different wall thicknesses depending on the manufacturer, the requirements of the particular application and/or the industry involved.

Common types of pipes used are copper, polybutylene or polymers of butylene, PEX pipe (white) such as cross-linked polyethylene, PVC (poly vinyl chloride), multi-layer composite aluminium, galvanised metals, stainless steels.

The purpose of a wall flange or escutcheon is to provide an aesthetic cover for the area where a pipe protrudes through a wall.

Wall flanges or escutcheons are produced in a number of standard sizes to cater for the current range of standard pipe types and diameters. Typically, wall flanges or escutcheons are manufactured for use on common sizes normally referred to by their approximate inside diameter.

Because of the different materials used, wall thicknesses and different pressure ratings, the outside diameter of the pipes will vary depending on the product. For example ½ inch pipes may have an outside diameter of anywhere between 0.57 inches (1.45 cm) and 0.85 inches (2.16 cm), while ¾ inch pipes will typically have a diameter of between 0.83 inches (2.11 cm) and 1.06 inches (2.69 cm).

Existing wall flanges or escutcheons are usually made from a plastic which has very little flexibility and cannot be stretched to fit a larger pipe. If the flange is stretched over a pipe it will tend to warp and buckle and will not sit flat against the wall.

Figure 1:
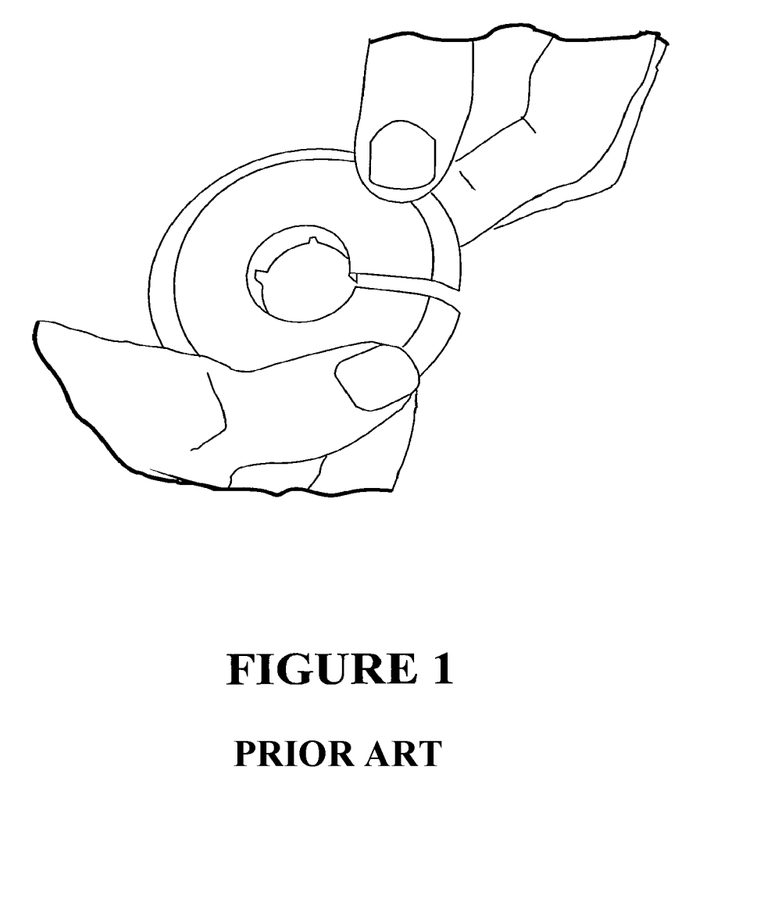
FIG. 1 shows a prior art split flange or split escutcheon type product.

A split flange product as shown in FIG. 1 can flex to accommodate a very small increase in outside diameter. However, if the increase in outside diameter is more than this, it will cause the flange to buckle and/or split open. The join created where the ends of the flange meet also leaves a line which is not aesthetically pleasing to the eye.

Because current wall flanges in the market are not made of material that is particularly flexible, and are instead manufactured to fit particular pipe sizes, it means that installers are forced to stock a number of flanges of differing sizes to ensure that when they are called to a job they can use the flange that is the correct size.

Pipes used for soil, waste, ducting, electrical and other similar applications often require pipes with larger diameters than other more general applications. Common sizes for such pipes are 1 inch, 1¼ inch, 1½ inch, 2 inch, 2½ inch, 3 inch, 4 inch and 6 inch. All of these sizes must be stocked too.

The thickness and outside diameter of some pipes can still vary, which means that even if the installer has a flange for the right generic pipe size, it may not fit properly. It can also be difficult to tell the difference between the different sized flanges by a quick visual inspection which can cause confusion during installation.

Because the fit of the prior art escutcheons cannot be guaranteed it is common practice to secure them by applying adhesive to the wall around the outer diameter of the pipe prior as an additional step in installation.

It is therefore an object or aspect of the present invention to provide an escutcheon or flange which will go at least some way towards offering an alternative answer to that currently offered or which will at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

In one aspect there is provided a moulded escutcheon or flange with options on the girth upon which its inner periphery or inner peripheries can adequately bear.

In another aspect there is provided a moulded escutcheon or flange which contacts the pipe, the wall, or both in a manner that negates the need to apply adhesive to secure it in place.

It yet a further aspect there is provided a moulded escutcheon or flange with at least one tear away or sacrificial zone whereby its inner periphery is adjusted.

In another aspect the invention is a moulded escutcheon or flange of a flexible material rendered less flexible by thickness and/or profile away from the zone of its inner periphery or an inner periphery formed by a tear away or a sacrificed moulded zone.

In another aspect the present invention consists in an escutcheon or wall flange ("escutcheon") to receive a pipe, conduit, cable or like member, the escutcheon or flange defining two faces, that to be concealed in use and that to be revealed in use, each bounded by an outer periphery, and an inner periphery or a definable inner periphery to bear on an intended pipe, conduit cable or the like member, wherein the escutcheon is of a flexible material limited as to its flex outwardly in the radial direction of the inner periphery or definite inner periphery by a profile feature of said face to be concealed in use or profile features of said face to be concealed in use.

Preferably said inner periphery is circular when viewed in plan from the surface to be concealed in use.

Preferably said escutcheon is circular or ring shaped when viewed in plan from the surface to be concealed in use.

Preferably said escutcheon is disc or plate like.

Preferably said profile feature is a step or graduation at a particular radial distance, or particular radial distances, whereby the thickness of the material between the face to be revealed in use and the face to be concealed is increased.

Preferably the zone at or proximate to the inner periphery has a greater ability to flex when compared to at least one or more outward zone(s) of greater thickness.

Preferably the zone at or proximate to the inner periphery has an ability to deflect in the axial direction.

Preferably the zone at or proximate to the inner periphery is substantially conical or frustoconical in shape.

Preferably said profile feature(s) is/are, or further incorporates, a raised rib or band of material to provide reinforcing at a said particular radial distance(s).

Preferably said profile feature also limits deflection of the inner periphery in the axial direction.

Preferably the escutcheon is at its outer periphery or outer peripheral zone, supported by an additional profile feature or profile features.

Preferably the escutcheon has at its outer periphery a region of tapering thickness.

Preferably said escutcheon is moulded as a single component.

Preferably said escutcheon is manufactured from a polymer.

Preferably said polymer is polyethylene, flexible PVC, flexibly modified polypropylene, thermoplastic polyurethane or another type of polymer capable of being flexible in a thin wall section.

Preferably said escutcheon is able to accommodate one, or two or more consecutive standard pipe sizes.

Preferably said standard pipes sizes able to be fitted are from the following range of sizes: ⅛ inch, ¼ inch, ⅜ inch, ½ inch, ¾ inch, 1 inch, 1¼ inch, 1½ inch, 2 inch, 3 inch, 4 inch, 5 inch and 6 inch, and their metric equivalents.

In a further aspect the present invention consists in an escutcheon or wall flange comprising a flexible inner ring-shaped region concentric to a rigid outer ring shaped region, said inner ring-shaped region having an inner periphery able to contract and expand in the radial direction, and wherein both regions having been formed as a singular moulding.

Preferably the zone at or proximate to the inner periphery has a greater ability to flex when compared to at least one or more outward zone(s) of greater thickness.

Preferably the zone at or proximate to the inner periphery has an ability to deflect in the axial direction.

Preferably the zone at or proximate to the inner periphery is moulded so as to be substantially conical or frustoconical in shape.

Preferably said inner ring-shaped region and said outer ring shaped region are formed from the same material, wherein the thickness of the material of the inner ring-shaped region is substantially less than that of the thickness of the material of the outer ring-shaped region.

Preferably there is also, as part of the moulding, a raised rib or band of reinforcing material around or within the zone of the inner periphery of the outer ring-shaped region, or around or within the zone of the outer periphery of the inner ring-shaped region.

Preferably said profile feature also limits deflection of the flexible inner ring-shaped region in the axial direction Preferably the escutcheon is at its outer periphery or outer peripheral zone, supported by an additional profile feature or profile features.

Preferably the escutcheon has at its outer periphery a region of tapering thickness.

Preferably said escutcheon is moulded as a single component.

Preferably said escutcheon is manufactured from a polymer.

Preferably said polymer is polyethylene, flexible PVC, flexibly modified polypropylene, thermoplastic polyurethane or another type of polymer capable of being flexible in a thin wall section.

Preferably said escutcheon is able to accommodate one, or two or more consecutive standard pipe sizes.

Preferably said standard pipes sizes able to be fitted are from the following range of sizes: ⅛ inch, ¼ inch, ⅜ inch, ½ inch, ¾ inch, 1 inch, 1¼ inch, 1½ inch, 2 inch, 3 inch, 4 inch, 5 inch and 6 inch, and their metric equivalents.

In yet another aspect the present invention consists in an escutcheon or wall flange to receive a pipe, conduit, cable or like member, the escutcheon or flange having:

(i) an outer periphery, and (ii) an inner periphery or a definable inner periphery to bear on an intended pipe, conduit cable or the like member, wherein the escutcheon or flange is of a flexible material limited as to its flex outwardly of the inner periphery, or definable inner periphery, by a profile feature and/or a thickness increase.

Preferably the escutcheon is moulded.

Preferably the zone at or proximate to the inner periphery is substantially conical or frustoconical in shape.

Preferably the escutcheon has its outer periphery or outer peripheral zone supported by a profile feature or profile features.

In a further aspect the present invention consists in an escutcheoned pipe, conduit, cable or the like where a flexible inner periphery of an escutcheon bears on the pipe, conduit, cable or the like, such inner periphery having been defined by a first moulding and then a tearing away of a sacrificial zone of the moulding.

Preferably the zone at or to the inner periphery has a greater ability to flex when compared to at least one or more outward zone(s) of greater thickness.

Preferably the zone at or proximate to the inner periphery has an ability to deflect in the axial direction.

Preferably the zone at or proximate to the inner periphery is moulded to be substantially conical or frustoconical in shape.

Preferably said sacrificial zone is circular or ring-shaped.

Preferably said moulding comprises two or more concentric sacrificial zones, each of which is able to be torn away independently of the other more outward sacrificial zones of the moulding.

Preferably the or each sacrificial zone is reinforced by a rib or profile feature.

Preferably the escutcheon has at its outer periphery a region of tapering thickness.

Preferably said sacrificial zone(s) is/are demarcated from one another and/or from the remaining portion of the moulding by a groove or channel.

Preferably said ring-shaped inner region (s) is/are demarcated from one another and/or from the remaining portion of the moulding by a perforated, thinner, or otherwise weakened zone of material.

Preferably said groove(s) or channel(s) are on the surface of the escutcheon which will be concealed in use.

Preferably said groove(s) or channel(s) are on the surface of the escutcheon which will be revealed in use.

Preferably at the base of said groove(s) or channel(s) there is a region of comparatively thinner material.

Preferably said region of comparatively thinner material is created by the intersection of a pair of angled side walls.

Preferably said region of comparatively thinner material is thicker in an outer sacrificial zone when compared to the thickness of the region of comparatively thinner material in a more inward sacrificial zone.

Preferably it is more difficult to tear away an outer sacrificial zone when compared to a more inward sacrificial zone.

Preferably said escutcheon is manufactured from a polymer.

Preferably said polymer is polyethylene, flexible PVC, flexibly modified polypropylene, thermoplastic polyurethane or another type of polymer capable of being flexible in a thin wall section.

Preferably said escutcheon is able to accommodate two or more consecutive standard pipe sizes.

Preferably said standard pipes sizes able to be fitted are from the following range of sizes: 32 millimeter, 40 millimeter, 50 millimeter, 65 millimeter, 80 millimeter, 100 millimeter and 200 millimeter, and their imperial equivalents.

In a further aspect the invention consists in an escutcheon or wall flange having, as a single moulding, an outer region with a circular inner periphery and one or more concentric ring-shaped inner regions within said circular inner periphery, wherein said ring-shaped inner region(s) can be detached from the outer region of the moulding and/or detached independently of more outward ring-shaped inner regions.

In yet another aspect the invention consists in an escutcheon or wall flange comprising, as a single moulding, an outer region with a circular inner periphery and one or more concentric ring-shaped inner regions within said circular inner periphery, wherein said ring-shaped inner region(s) are detachable from the outer region of the moulding and/or are detached independently of more outward ring-shaped inner regions.

With respect to the above aspects, the following preferred features are considered.

Preferably said detachment occurs by tearing of one portion of the moulding away from the other.

Preferably said moulding also includes a circular sacrificial zone within the inner periphery of the innermost ring-shaped inner region.

Preferably the zone at or to the inner periphery of the innermost ring-shaped inner region has a greater ability to flex when compared to at least one or more outward zone(s) of greater thickness.

Preferably the zone at or proximate to the inner periphery of the innermost ring-shaped inner region has an ability to deflect in the axial direction.

Preferably the zone at or proximate to the inner periphery of the innermost ring-shaped inner region is substantially conical or frustoconical in shape.

Preferably the or each ring-shaped inner region is reinforced by a rib or profile feature.

Preferably the outer region is reinforced by one or more rib or profile features.

Preferably said ring-shaped inner region (s) is/are demarcated from one another and/or from the remaining portion of the moulding by a groove or channel.

Preferably said ring-shaped inner region (s) is/are demarcated from one another and/or from the remaining portion of the moulding by a perforated or otherwise weakened zone of material.

Preferably said groove(s) or channel(s) are on the surface of the escutcheon which will be concealed in use.

Preferably said groove(s) or channel(s) are on the surface of the escutcheon which will be revealed in use.

Preferably at the base of said groove(s) or channel(s) there is a region of comparatively thinner material.

Preferably said region of comparatively thinner material is created by the intersection of a pair of angled side walls.

Preferably said region of comparatively thinner material is thicker in an outer ring-shaped inner region when compared to the thickness of the region of comparatively thinner material in a more inward ring-shaped inner region.

Preferably it is more difficult to tear away an outer ring-shaped inner region when compared to a more inward ring-shaped inner region.

Preferably said escutcheon is manufactured from a polymer.

Preferably said polymer is polyethylene, flexible PVC, flexibly modified polypropylene, thermoplastic polyurethane or another type of polymer capable of being flexible in a thin wall section.

Preferably said escutcheon is able to accommodate two or more consecutive standard pipe sizes.

Preferably said standard pipes sizes able to be fitted are from the following range of sizes: 32 millimeter, 40 millimeter, 50 millimeter, 65 millimeter, 80 millimeter, 100 millimeter and 200 millimeter, and their imperial equivalents.

In a further aspect the present invention consists in an escutcheon or wall flange ("escutcheon") having a flexible inner periphery capable of deformation in the radial and axial directions and a flexible outer periphery, said inner and outer peripheries separated by a body region;

wherein said flexible inner periphery of can, in use, bear on a pipe, conduit, cable or the like ("pipe"), such that an airtight seal around the outer diameter of said pipe is formed by said inner periphery;

and wherein, in use, under the application of pressure to the body region in a direction toward the wall on which said pipe is to be mounted, said flexible outer periphery is able to deform so as to maintain a suction mount connection between said escutcheon and said wall.

Preferably the zone at or proximate to the inner periphery is substantially conical or frustoconical in shape.

In a further aspect the invention consists in a method of fitting an escutcheon or wall flange to a pipe, comprising the steps of:

1. tearing away one or more concentric ring shaped inner-regions of the escutcheon so that the diameter of the inner periphery of the escutcheon is slightly less than the outer diameter of the pipe; and 2. stretching the escutcheon over the end of the pipe; and 3. allowing the inner periphery of the escutcheon to contract around the outer surface of the pipe to obtain a pressure or slide fit.

In a further aspect the invention consists in the use of an escutcheon or wall flange as described herein in any of its aspects in the installation of a pipe, conduit, cable or like member.

In a further aspect the invention consists in an escutcheon or wall flange substantially as herein described with reference to the accompanying drawings.

In a further aspect the present invention consists in an escutcheoned pipe, conduit, cable or the like where a flexible inner periphery of an escutcheon bears on the pipe, conduit, cable or the like, such flexible inner periphery being of a flexible zone surrounded by a profile and/or thickness of the same escutcheon material that restricts its flexibility.

As described above, various aspects have been described. It will be appreciated such aspects can be provided in combination with each other, in particular details of sacrificial zones or tear-away portions can be combined with portions or regions which are flexible or have flexibility determined either by material characteristics or structural elements of the wall flange or escutcheon (for example thickness of wall sections or of tapering thickness lips).

As used herein the term "escutcheon" means an ornamental or protective plate, disc or component able to be fitted around the outer surface of a pipe, conduit, cable, rod or other cylindrical member so as to make contact around substantially its entire circumference.

As used herein the term "(s)" following a noun includes, as might be appropriate, the singular or plural forms of that noun.

As used herein the term "and/or" means "and" or "or". In some circumstances it can mean both.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The invention consists in the foregoing and also envisages constructions of which the following gives examples only.

BRIEF DESCRIPTION OF THE DRAWINGS

Preferred forms of the present invention will now be described with reference to the accompanying drawings in which.

DETAILED DESCRIPTION OF PREFERRED EMBODIMENTS

Figure 2:
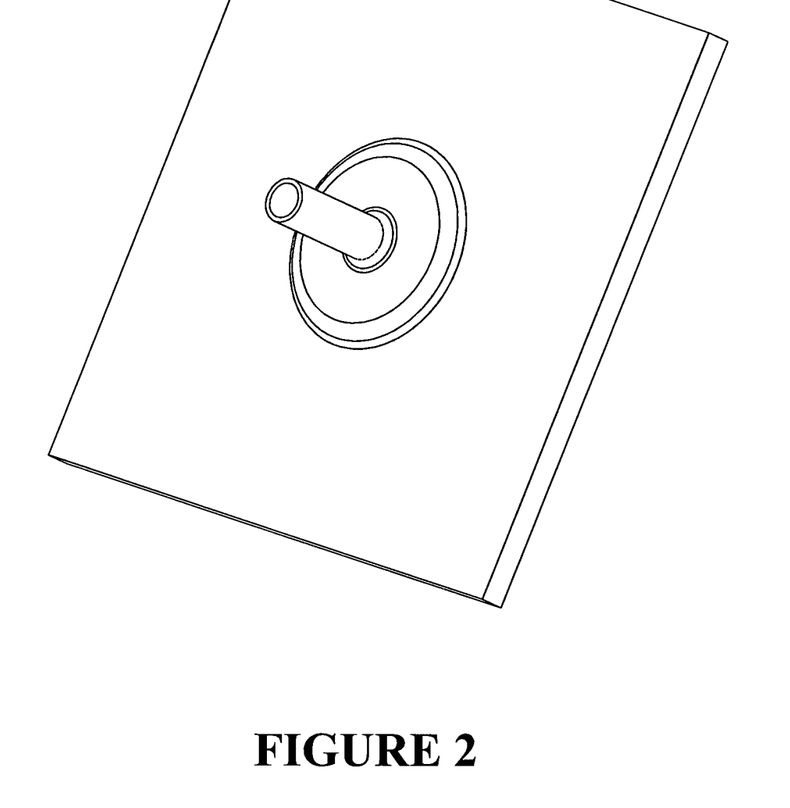
FIG. 2 shows an isometric view of a wall mounted pipe surrounded by a preferred embodiment of a flange or escutcheon of the present invention.
Figure 3:
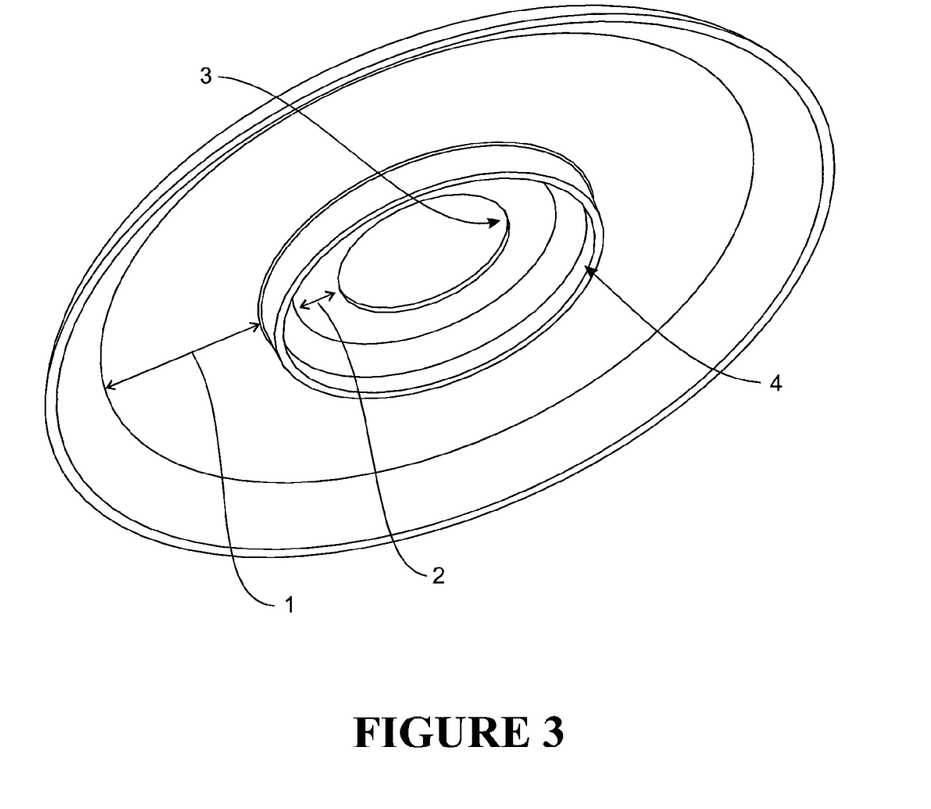
FIG. 3 shows an isometric view of a preferred embodiment of a flange or escutcheon of the present invention, slightly different from that shown in FIG. 2, as viewed from the face to be concealed in use.

The invention consists in a wall flange or escutcheon to be fitted over the edge of a pipe protruding through a wall, thus creating a tidy and visually appealing finish, wherein a single such component can accommodate a variety of outer diameter pipe sizes. Generally it is desirable that the edges of the escutcheon make even contact with the wall all the way around the pipe, i.e. that the flange does not buckle or bend once fitted to the pipe regardless of variations in the size of the pipe. An example of a correctly fitting flange of the present invention is shown in FIG. 2.

The invention in its aspects preferably is an article moulded of a flexible material with a reveal face and a conceal face, the reveal face preferably (but not necessarily) being that with profile features or steps or ramping in thickness to provide the variation in flex and/or rigidity desired. The article as an escutcheon may require some post mould modification or not depending on its form and/or the size to be received.

In a preferred embodiment, the flange or escutcheon is a disc or plate like component having a rigid outer ring shaped region 1, but also having a flexible inner ring shaped region 2. This allows the installer to stretch the inner ring of the flange over the end of the pipe without causing the rest of the body of the component to buckle. Other embodiments of the invention might assume alternative shapes, for example hemispherical or square shaped escutcheons, that would nonetheless be fitted in the same manner.

The inner lip 3 of the inner ring shaped region 2 contracts to the outside diameter of the pipe producing a pressure/slide fit. There is preferably an underside reinforcing ring or rib 4 which provides rigidity and torsional strength to prevent the flange from twisting and to also limit the degree of upward (or optionally downward) deflection of the inner lip 3 when fitted on the pipe.

Figure 4:
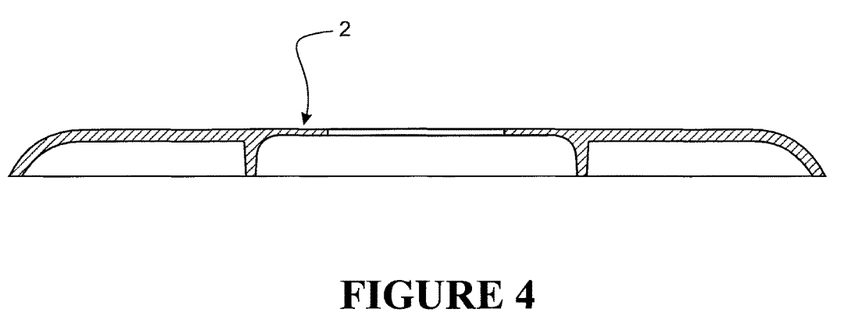
FIG. 4 is a cross sectional side view of the flange or escutcheon of FIG. 3.

The more rigid and more flexible areas are created by producing a part with, respectively, thicker or thinner wall sections (for example region 2 as shown in FIG. 4) in the regions where flexibility is needed than in the remaining regions. In this way the part can be made in a single moulding, most preferably from a polymer such as polyethylene, flexible PVC, flexibly modified polypropylene or any other polymer capable of being flexible in the thin wall section, yet more rigid in thicker wall section.

Preferably the flange or escutcheon is manufactured to fit standard pipe sizes, for example ⅛ inch, ¼ inch, ⅜ inch, ½ inch, ¾ inch, 1 inch, 1¼ inch, 1½ inch, 2 inch, 3 inch, 4 inch etc and their metric equivalents, or to fit any other sized pipes. The inner region 2 provides enough flexibility to accommodate variations in the outer dimension of pipes where the same nominally sized pipe has been manufactured to different tolerances, and also to accommodate for the different wall thicknesses that may be manufactured depending on the material of the pipe. In some embodiments a single flange may be manufactured to be able to be used upon two or more of the standard pipe sizes listed above.

Figure 5:
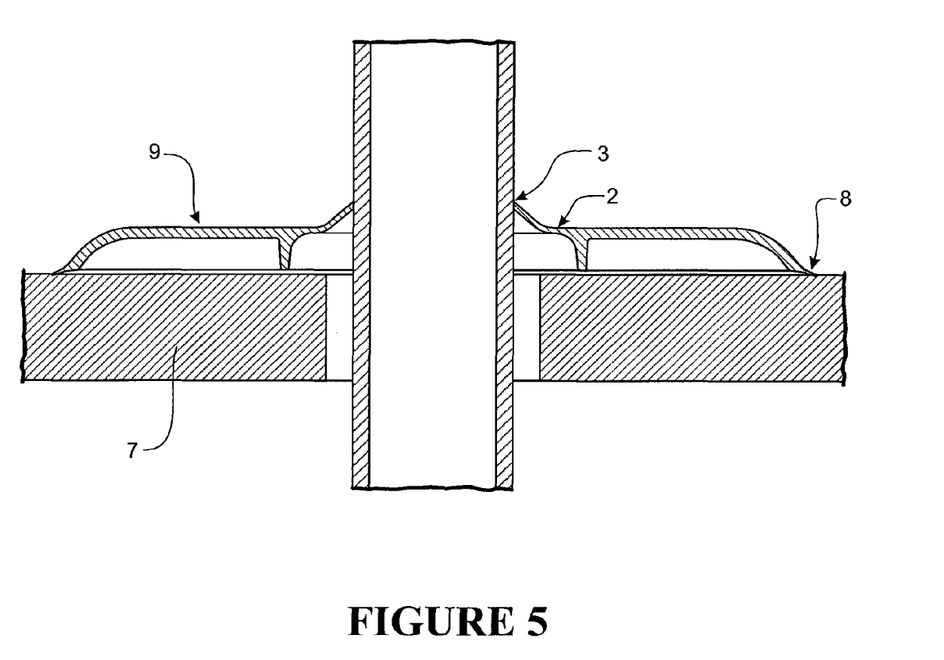
FIG. 5 is a cross sectional side view of the wall mounted pipe and flange or escutcheon of FIG. 2.

FIG. 5 shows cross section of a wall mounted pipe with a surrounding escutcheon or wall flange of one embodiment of the present invention. In this embodiment the escutcheon behaves like a suction cup.

It can be seen that the inner lip 3 of the inner ring shaped region 2 can be subject to substantial deflection in the direction away from the wall 7 when installed. Alternatively the flange might by moulded so that the inner lip 3 is sloped in this direction. Because of the elasticity of the inner ring shaped region the sloped or deflected inner lip serves as a bias to hold the flange in position against the wall.

Similarly there may be a lip of tapering thickness 8 around the outer periphery of the flange. This lip is also flexible. Applying pressure to the surface 9 of the flange will deform the lip to enable the creation of a seal around the perimeter of the flange and consequently some degree of suction to hold the flange to wall. This prevents the flange from moving away from the wall or spinning about the pipe, and also avoids the need to apply an additional adhesive to prevent this.

In an alternative embodiment, the present invention envisages also a moulded, or moulded and post mould modified, member having one (or more) locus (or loci) of weakening (e.g. frangible, scored, or otherwise) to allow end user choice of inner peripheral size of a selected flexible zone.

Figure 6:
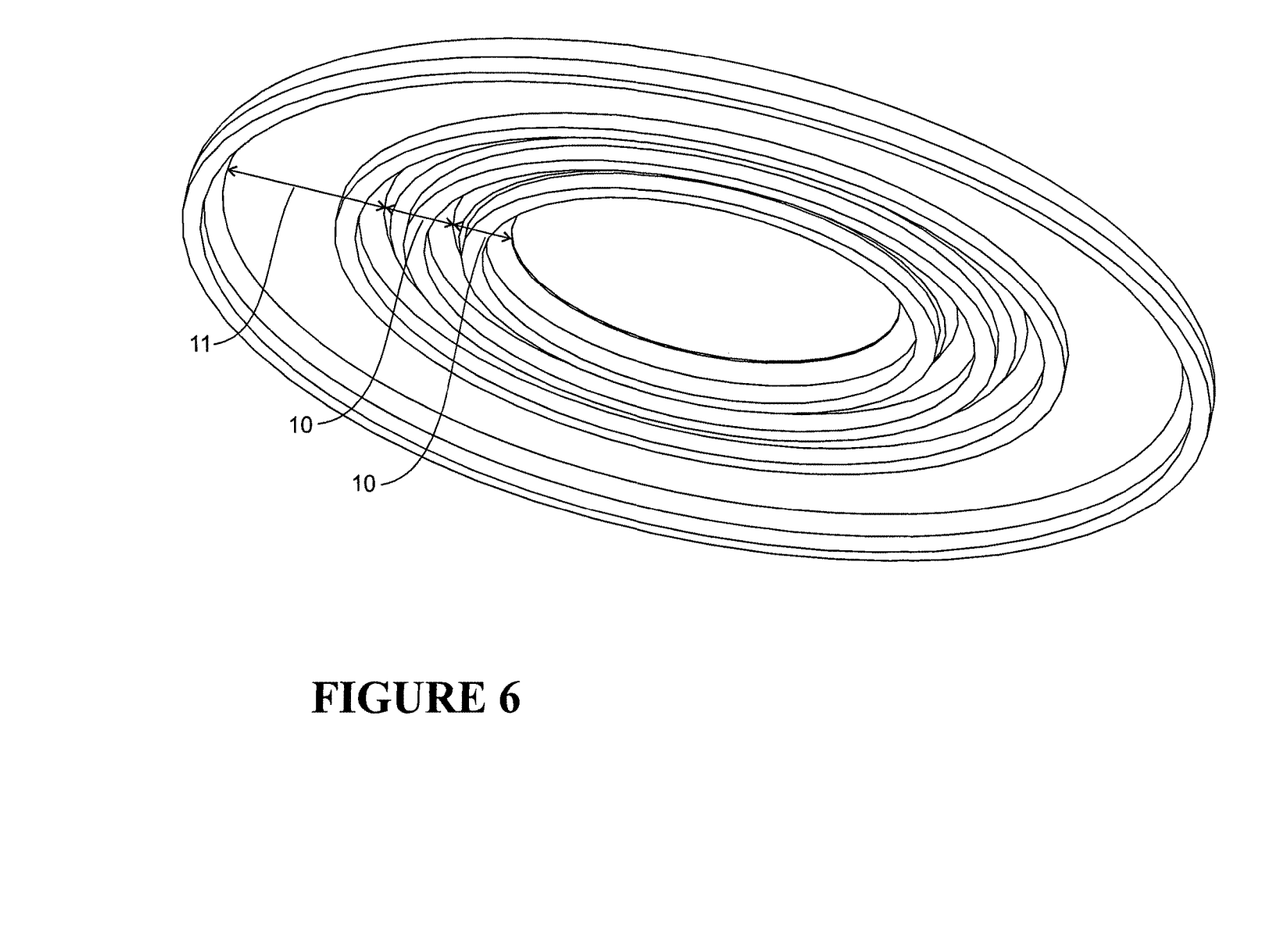
FIG. 6 is an isometric view of a second preferred embodiment of a flange or escutcheon of the present invention having one outer ring shaped region and two concentric inner ring shaped regions, the inner regions being able to be torn off from each other as needed, viewed from the face to be concealed in use.

In such an embodiment the flange or escutcheon comprises a series of concentric inner ring shaped regions 10 within an outer ring shaped region 11. These may optionally each be supported by a circular rib feature as shown. The flange may have two inner ring regions 10 as shown in FIG. 6, but in other embodiments there may be more or less ring regions.

Figure 7:
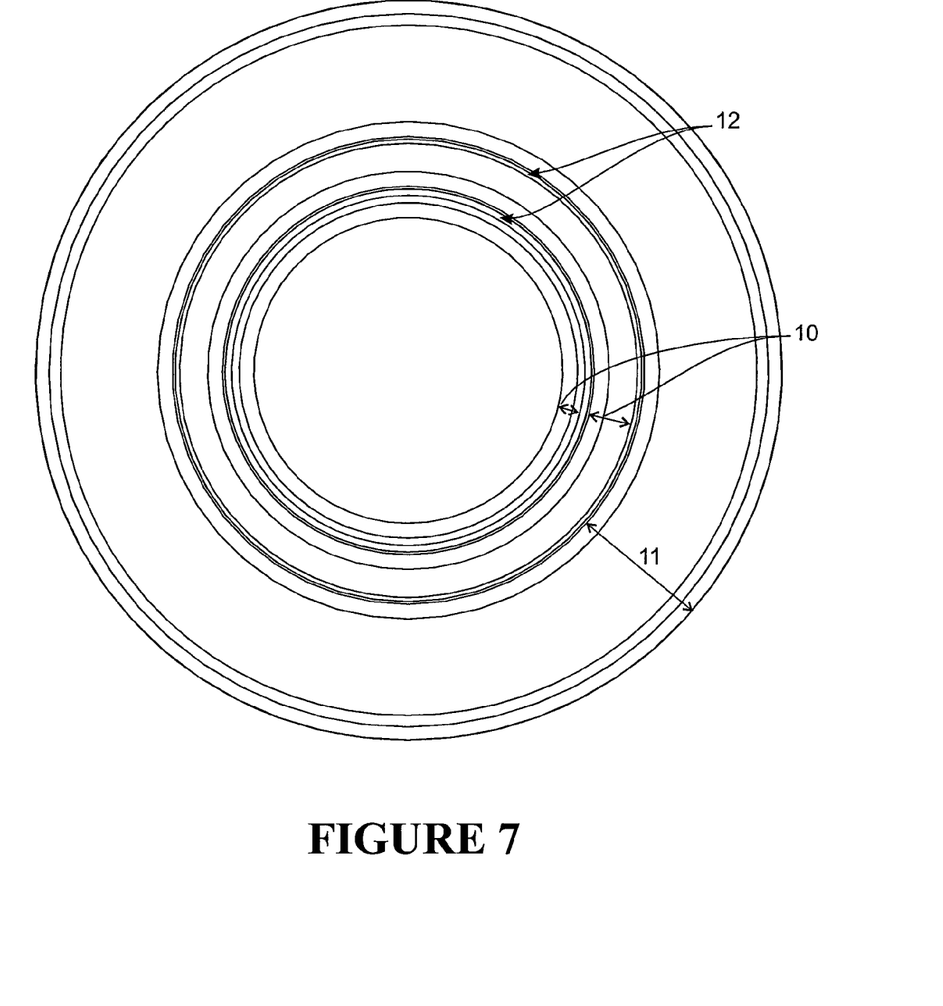
FIG. 7 is a plan view, from the face to be concealed in use, of a the flange or escutcheon of FIG. 6, showing the grooved joining zones between the inner ring shaped regions.

FIG. 7 shows an embodiment of the flange having two inner ring regions 10. Between each of the inner ring regions 10 there is a joining zone 12 which enables one ring shaped region to be torn off from the next.

Depending on the outer diameter of the pipe to which the flange is to be fitted, an installer can either fit the flange as it is originally supplied, or can choose to tear off as many of the concentric inner ring shaped regions 10 as needed to obtain a correct fit. This means that the installer will not have to stock numerous flanges to account for the range in pipe sizes and their differing outside diameters.

Preferably the flange or escutcheon is made from a semi-flexible or flexible material that, once stretched over the pipe, will contract to the outside diameter of the pipe producing a pressure/slide fit. The flexibility also ensures that small variations in outer diameter due to manufacturing tolerances and different materials can be accommodated. Suitable materials could be polyethylene, flexible PVC, flexibly modified polypropylene, thermoplastic polyurethane or any other polymer capable of being flexible in the thin wall section.

In a preferred embodiment (shown in cross section in FIG. 8) there are continuous circular grooves 13 and 14 which run around each joining zone 12, creating a region of thinner material to permit the inner rings 10 to be torn off from one another. A person skilled in the art will appreciate that perforations or other variations at the joining zones 12 could be used to achieve the same result. The grooves 13 and 14 are preferably on the underside 15 of the body of the flange so that they cannot be seen when the flange is fitted against the wall, but could optionally be on the top or visible side 16 or on both sides.

Figure 8:
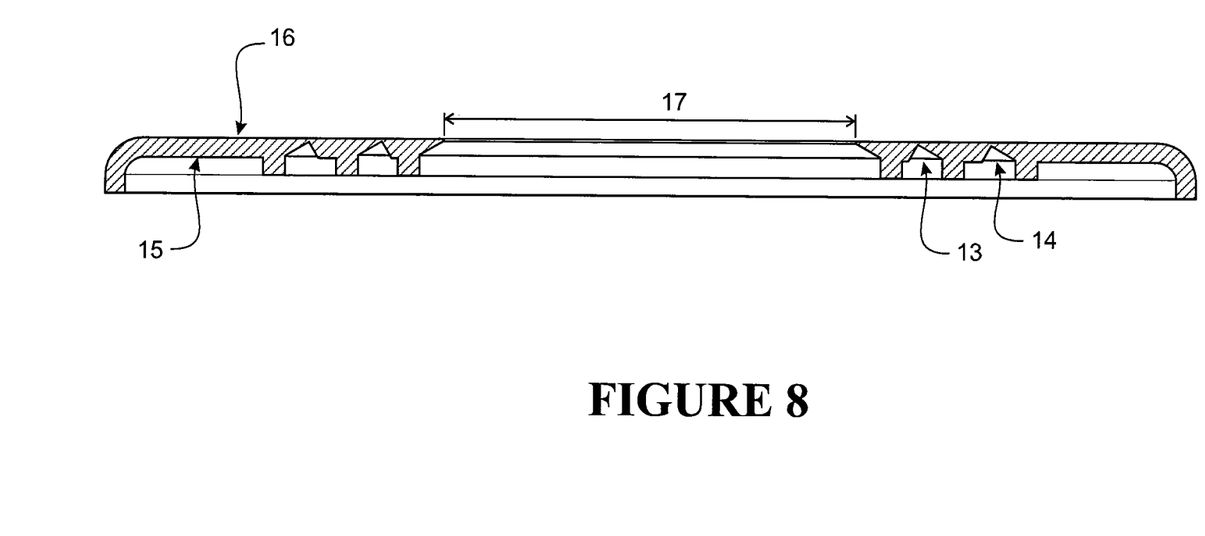
FIG. 8 is a cross sectional side view of the flange or escutcheon of FIGS. 6 and 7.

At its thinnest point, the thickness of the material of the inner groove 13 is thinner than the thickness of the material of the groove 14 at its thinnest point. This is to ensure that a greater force is required to tear off the outer ring than the inner ring. Because the inner ring is the easiest to tear-off the installer is unlikely to accidentally tear-off both rings if the intention was only to remove the inner ring.

As shown in FIG. 8, the cross section of each grooved join 13 or 14 may be angled to ensure a clean tear off. The thinner material in the angled region provides added flexibility to allow the flange to be stretched over the pipe.

Preferably the flange is moulded as a single part. The dies used for moulding can be concentric circles, which means that it is easy to adjust the number of inner ring shaped regions 5 produced during manufacture by adding or taking away dies as needed.

In another embodiment the flange could be supplied for use with a circular sacrificial material region 12 inside the innermost inner ring shaped region 5. The central sacrificial piece 12 could then be torn out and discarded by the installer.

There are advantages to production efficiency in manufacturing the part in this manner. One of these is that during the moulding of the flange, material can be injected into the die in the centre of the sacrificial zone and will then spread outward to the edges of the part. This is as opposed to having to inject the material so that it forms around the hole in the innermost inner ring shaped region.

It will be appreciated that the aforementioned wall flange or escutcheon provides for particular advantages when used in a wall flanging or wall escutcheon type arrangement.

The foregoing description of the invention includes preferred forms thereof. Modifications may be made thereto without departing from the scope of the invention.

Preferred Features

1. An escutcheon or wall flange to receive a pipe, conduit, cable or like member, the escutcheon or flange having:
    an outer periphery, and
    an inner periphery or a definable inner periphery to bear on an intended pipe, conduit cable or the like member,
    wherein the escutcheon or flange is of a flexible material limited as to its flex outwardly of the inner periphery, or definable inner periphery, by a profile feature and/or a thickness increase.
2. The escutcheon as claimed in claim 1, wherein said escutcheon is moulded.
3. The escutcheon as claimed in claim 1 or claim 2, wherein a zone at or proximate to the inner periphery is substantially conical or frustoconical in shape.
4. The escutcheon as claimed in any one of claims 1 to 3, wherein said outer periphery or a zone of said outer periphery is supported by a profile feature or profile features.
5. The escutcheon as claimed in any one of claims 1 to 4, wherein said inner periphery is circular when viewed in plan from the surface to be concealed in use.
6. The escutcheon as claimed in any one of claims 1 to 5, wherein said escutcheon is circular or ring shaped when viewed in plan from the surface to be concealed in use.
7. The escutcheon as claimed in any one of claims 1 to 6, wherein said escutcheon is disc or plate like.
8. The escutcheon as claimed in any one of claims 1 to 7, wherein said profile feature is a step or graduation at a particular radial distance, or particular radial distances, whereby the thickness of the material between the face to be revealed in use and the face to be concealed is increased.
9. The escutcheon as claimed in any one of claims 1 to 8, wherein a or the zone at or proximate to the inner periphery has a greater ability to flex when compared to at least one or more outward zone(s) of greater thickness of the material between the face to be revealed in use and the face to be concealed is increased.
10. The escutcheon as claimed in any one of claims 1 to 9, wherein a or the zone at or proximate to the inner periphery has an ability to deflect in the axial direction.
11. The escutcheon as claimed in any one of claims 1 to 10, wherein a or the zone at or proximate to the inner periphery is substantially conical or frustoconical in shape.
12. The escutcheon as claimed in any one of claims 1 to 11, wherein said profile feature(s) is/are, or further comprises, a raised rib or band of material to provide reinforcing at a said particular radial distance(s).
13. The escutcheon as claimed in any one of claims 1 to 12, wherein said profile feature(s) is a structural element.
14. The escutcheon as claimed in any one of claims 1 to 13, wherein said profile feature(s) limits deflection of the inner periphery or a definable inner periphery in the axial direction.
15. The escutcheon as claimed in any one of claims 1 to 14, wherein the inner periphery or a definable inner periphery is a flexible inner ring-shaped region, said profile feature limiting deflection in the radial direction.
16. The escutcheon as claimed in any one of claims 1 to 15, wherein the inner periphery or a definable inner periphery is a flexible inner ring-shaped region, said profile feature limiting deflection in the axial direction.
17. The escutcheon as claimed in any one of claims 1 to 16, wherein said inner periphery or a definable inner periphery and said outer periphery or a region thereof are formed from the same material, wherein the thickness of the material of the inner periphery or a definable inner periphery is substantially less than that of the thickness of the material of the outer periphery or a region thereof.

18. The escutcheon as claimed in any one of claims 1 to 17, wherein said inner periphery or a definable inner periphery is an inner ring-shaped region and said outer periphery or a region thereof is a ring shaped region, each of said regions formed from the same material, wherein the thickness of the material of the inner ring-shaped region is substantially less than that of the thickness of the material of the outer ring-shaped region.

19. The escutcheon as claimed in any one of claims 1 to 18, wherein said escutcheon further comprises, as a part of the moulding, a raised rib or band of reinforcing material around or within a or the zone of the inner periphery of the outer ring-shaped region, or around or within a or the zone of the outer periphery of the inner ring-shaped region.

20. The escutcheon as claimed in any one of claims 1 to 19, wherein the escutcheon is at its outer periphery or outer peripheral zone supported by an additional one or more profile feature or profile features.

21. The escutcheon as claimed in any one of claims 1 to 20, wherein the escutcheon has at its outer periphery a region of tapering thickness.

22. The escutcheon as claimed in any one of claims 1 to 21, wherein said escutcheon is moulded as a single (e.g. unitary) component.

23. The escutcheon as claimed in any one of claims 1 to 22, wherein said escutcheon is manufactured or formed from a polymeric material.

24. The escutcheon as claimed in claims 1 to 23, wherein said polymeric material is one or more of: polyethylene, flexible PVC (polyvinylchloride), flexibly modified polypropylene, thermoplastic polyurethane (TPU) or another type of polymer capable of being flexible in a thin wall section.

25. The escutcheon as claimed in any one of claims 1 to 24, wherein said escutcheon is able to accommodate one, or two or more consecutive standard pipe sizes.

26. The escutcheon as claimed in claim 25, wherein said standard pipes sizes able to be fitted are from the following range of sizes: ⅛ inch, ¼ inch, ⅜ inch, ½ inch, ¾ inch, 1 inch, 1¼ inch, 1½ inch, 2 inch, 3 inch, 4 inch, 5 inch and 6 inch, and their metric equivalents, or ⅛ inch, ¼ inch, ⅜ inch, ½ inch, ¾ inch, 1 inch, 1¼ inch, 1½ inch, 2 inch, 3 inch, 4 inch, 5 inch and 6 inch, and their metric equivalents.

27. An escutcheon or wall flange ("escutcheon") to receive a pipe, conduit, cable or like member, the escutcheon or flange defining two faces, that to be concealed in use and that to be revealed in use, each bounded by an outer periphery, and an inner periphery or a definable inner periphery to bear on an intended pipe, conduit cable or the like member, wherein the escutcheon is of a flexible material limited as to its flex outwardly in the radial direction of the inner periphery or definite inner periphery by a profile feature of said face to be concealed in use or profile features of said face to be concealed in use.

28. The escutcheon as claimed in claim 27, wherein said profile feature limits deflection of the flexible inner ring-shaped region in the axial direction 29. The escutcheon as claimed in claim 27 or claim 28, wherein said inner ring-shaped region and said outer ring shaped region are formed from the same material, wherein the thickness of the material of the inner ring-shaped region is substantially less than that of the thickness of the material of the outer ring-shaped region.

30. The escutcheon as claimed in any one of claims 27 to 29, wherein further comprising, as a part of the moulding, a raised rib or band of reinforcing material around or within the zone of the inner periphery of the outer ring-shaped region, or around or within a or the zone of the outer periphery of the inner ring-shaped region.

31. The escutcheon as claimed in any one of claims 27 to 30, wherein said escutcheon is as further defined by any one of claims 1 to 26.

32. An escutcheon or wall flange comprising a flexible inner ring-shaped region concentric to a rigid outer ring shaped region, said inner ring-shaped region having an inner periphery able to contract and expand in the radial direction, and wherein both regions having been formed as a singular moulding.

33. The escutcheon as claimed in claim 32, wherein said escutcheon is as further defined by any one of claims 1 to 30.

34. An escutcheon or wall flange ("escutcheon") having a flexible inner periphery capable of deformation in the radial and axial directions and a flexible outer periphery, said inner and outer peripheries separated by a body region;

wherein said flexible inner periphery of can, in use, bear on a pipe, conduit, cable or the like ("pipe"), such that an airtight seal around the outer diameter of said pipe is formed by said inner periphery;

and wherein, in use, under the application of pressure to the body region in a direction toward the wall on which said pipe is to be mounted, said flexible outer periphery is able to deform so as to maintain a suction mount connection between said escutcheon and said wall.

35. The escutcheon as claimed in claim 34, wherein said escutcheon is as further defined by any one of claims 1 to 30 or claim 32.

36. A method of fitting an escutcheon or wall flange to a pipe, comprising the steps of:

stretching and/or deflecting an inner periphery or a definable inner periphery to bear on an intended pipe, conduit, cable or the like member, and allowing the inner periphery or the definable inner periphery of the escutcheon to contract around the outer surface of the pipe, conduit, cable or the like member to obtain a pressure or slide fit.

37. The method as claimed in claim 36, wherein said escutcheon is as defined in any one of claims 1 to 35.

38. An escutcheon or wall flange comprising, as a single moulding, an outer region with a circular inner periphery and one or more concentric ring-shaped inner regions within said circular inner periphery, wherein said ring-shaped inner region(s) are detachable from the outer region of the moulding and/or are detached independently of more outward ring-shaped inner regions.

39. The flange as claimed in claim 38, wherein said detachment is by tearing of at least one inner region portion of the moulding away from another inner region or the more outwardly inner regions.

40. The flange as claimed in claim 38 or claim 39, wherein said flange further comprises a circular sacrificial zone within the inner periphery of the innermost ring-shaped inner region.

41. The flange as claimed in claim 40, wherein said sacrificial zone at or to the inner periphery of the innermost ring-shaped inner region has a greater ability to flex relative to at least one or more outward regions(s) of greater thickness.

42. The flange as claimed in claim 40 or claim 41, wherein said sacrificial zone at or proximate to the inner periphery of the innermost ring-shaped inner region has an ability to deflect in an axial direction.

43. The flange as claimed in any one of claims 40 to 42, wherein said sacrificial zone at or proximate to the inner periphery of the innermost ring-shaped inner region is substantially conical or frusto-conical in shape.

44. The flange as claimed in any one of claims 40 to 43, wherein said sacrificial zone is circular or ring-shaped.

45. The flange as claimed in any one of claims 40 to 44, wherein said flange comprises two or more concentric sacrificial zones, each of which is able to be torn away independently of other more outward sacrificial zones of the flange.

46. The flange as claimed in any one of claims 38 to 45, wherein the or each ring-shaped inner region, or sacrificial zone, is reinforced by a rib or a profile feature.

47. The flange as claimed in any one of claims 38 to 48, wherein the outer region is reinforced by one or more rib or profile features.

48. The flange as claimed in any one of claims 38 to 47, wherein at the outer periphery of said flange is a region of tapering thickness.

49. The flange as claimed in any one of claims 38 to 48, wherein said ring-shaped inner region(s) is/are demarcated from one another and/or from the remaining portion of the flange by a perforated or otherwise weakened zone of material.

50. The flange as claimed in any one of claims 38 to 49, wherein said ring-shaped inner region(s) is/are demarcated from one another and/or from the remaining portion of the flange by a groove or channel, or each of said sacrificial zone(s) is/are demarcated from one another and/or from the remaining portion of the flange by a groove or channel.

51. The flange as claimed in claim 50, wherein said groove(s) or channel(s) are on the surface of the flange to be concealed in use.

52. The flange as claimed in claim 50, wherein said groove(s) or channel(s) are on the surface of the flange to be revealed in use.

53. The flange as claimed in any one of claims 50 to 52, wherein said groove(s) or channel(s) comprise a base with a region of comparatively thinner material or wall section thickness.

54. The flange as claimed in claim 53, wherein said region of comparatively thinner material is created by the intersection of a pair of angled side walls.

55. The flange as claimed in claim 53 or claim 54, wherein said region of comparatively thinner material is thicker in an outer ring-shaped inner region when compared to the thickness of the region of comparatively thinner material in a more inward ring-shaped inner region.

56. The flange as claimed in any one of claims 38 to 55, wherein it is more difficult to tear away an outer ring-shaped inner region when compared to a more inward ring-shaped inner region.

57. The flange as claimed in any one of claims 38 to 56, wherein said flange is manufactured from a polymer.

58. The flange as claimed in claim 57, wherein said polymer is one or more of: polyethylene, flexible PVC (polyvinylchloride), flexibly modified polypropylene, thermoplastic polyurethane (TPU) or another type of polymer capable of being flexible in a thin wall section.

59. The flange as claimed in any one of claims 38 to 58, wherein said flange is able to accommodate two or more consecutive standard pipe sizes.

60. The flange as claimed in claim 59, wherein said standard pipes sizes able to be accommodated are from the following range of sizes: 32 millimeter, 40 millimeter, 50 millimeter, 65 millimeter, 80 millimeter, 100 millimeter and 200 millimeter, and their imperial equivalents.

61. The flange as claimed in claim 59 or claim 60, wherein said standard pipes sizes able to be accommodated are from the following range of sizes: ⅛ inch, ¼ inch, ⅜ inch, ½ inch, ¾ inch, 1 inch, 1¼ inch, 1½ inch, 2 inch, 3 inch, 4 inch, 5 inch and 6 inch, and their metric equivalents.

62. The flange as claimed in any one of claims 38 to 61, wherein the flange is a wall flange or an escutcheon.

63. An escutcheoned pipe, conduit, cable or the like wherein a flexible inner periphery of an escutcheon bears on the pipe, conduit, cable or the like, such inner periphery having been defined by a first moulding and then a tearing away of a sacrificial zone of the moulding.

64. The escutcheoned pipe, conduit, cable or the like as claimed in claim 63, wherein said escutcheon is the flange as defined in any one of claims 38 to 62.

65. A method of fitting an escutcheon or wall flange to a pipe, comprising the steps of:
    tearing away one or more concentric ring shaped innerregions of the escutcheon so that the diameter of the inner periphery of the escutcheon is slightly less than the outer diameter of the pipe, and
    stretching the escutcheon over the end of the pipe, and
    allowing the inner periphery of the escutcheon to contract around the outer surface of the pipe to obtain a pressure or slide fit.

66. The method as claimed in claim 65, wherein the escutcheon is as defined in any one of claims 38 to 64.

The invention claimed is:

1. An escutcheon to receive a pipe, conduit, cable or like member protruding through a wall, the escutcheon molded as a unitary component, the escutcheon comprising:
    an outer periphery provided by a rigid outer ring-shaped region to contact a wall,
    an inner periphery provided by a flexible inner ring-shaped region to bear on an intended pipe, conduit cable or the like member,
    wherein the rigid outer ring-shaped region and the flexible inner ring-shaped region are formed from the same material,
    wherein a thickness of the inner ring-shaped region is less than a thickness of the outer ring-shaped region, so that the inner ring-shaped region has a greater ability to flex when compared to the outer ring-shaped region,
    wherein the escutcheon is limited as to its flex outwardly of the inner periphery by a profile feature, and
    wherein the outer ring-shaped region is supported by the profile feature, the profile feature comprising a raised rib or band of material to contact the wall and provide reinforcing at a radial distance from the inner periphery to prevent the outer ring-shaped region from twisting and buckling.

2. The escutcheon as claimed in claim 1, wherein a zone at or proximate to the inner periphery is substantially conical or frustoconical in shape.

3. The escutcheon as claimed in claim 1, wherein said inner periphery is circular when viewed in plan from the surface to be concealed in use.

4. The escutcheon as claimed in claim 1, wherein said escutcheon is circular or ring shaped when viewed in plan from the surface to be concealed in use.

5. The escutcheon as claimed in claim 1, wherein said escutcheon is disc or plate like.

6. The escutcheon as claimed in claim 1, wherein said profile feature includes a step or graduation at the radial distance, whereby a thickness of the material between a face of the escutcheon to be revealed in use and a face of the escutcheon to be concealed is increased from the thickness of the inner ring-shaped region to the thickness of the outer ring-shaped region.

7. The escutcheon as claimed in claim 1, wherein a or the zone at or proximate to the inner periphery has an ability to deflect in the axial direction.

8. The escutcheon as claimed in claim 1, wherein said profile feature is a structural element.

9. The escutcheon as claimed in claim 1, wherein said profile feature limits deflection of the inner periphery in the axial direction.

10. The escutcheon as claimed in claim 1, wherein the profile feature limits deflection in the radial direction.

11. The escutcheon as claimed in claim 1, wherein the profile feature limits deflection in the axial direction.

12. The escutcheon as claimed in claim 1, wherein said raised rib or band of material is around or within the outer ring-shaped region.

13. The escutcheon as claimed in claim 1, wherein the outer ring-shaped region is supported by an additional one or more profile feature or profile features.

14. The escutcheon as claimed in claim 1, wherein the escutcheon has at its outer periphery a region of tapering thickness.

15. The escutcheon as claimed in claim 1, wherein said escutcheon is manufactured or formed from a polymeric material.

16. The escutcheon as claimed in claim 15, wherein said polymeric material is one or more of: polyethylene, flexible PVC (polyvinylchloride), flexibly modified polypropylene, thermoplastic polyurethane (TPU) or another type of polymer capable of being flexible in a thin wall section.

17. The escutcheon as claimed in claim 1, wherein said escutcheon is able to accommodate one, or two or more consecutive standard pipe sizes.

18. The escutcheon as claimed in claim 17, wherein said standard pipes sizes able to be fitted are from the following range of sizes: 1/8 inch, 1/4 inch, 3/8 inch, 1/2 inch, 3/4 inch, 1 inch, 1 1/4 inch, 1 1/2 inch, 2 inch, 3 inch, 4 inch, 5 inch and 6 inch, and their metric equivalents, or 1/8 inch, 1/4 inch, 3/8 inch, 1/2 inch, 3/4 inch, 1 inch, 1 1/4 inch, 1 1/2 inch, 2 inch, 3 inch, 4 inch, 5 inch and 6 inch, and their metric equivalents.

19. The escutcheon as claimed in claim 1, the escutcheon defining two faces, a face that is concealed in use and a face that is revealed in use, each face bounded by the outer periphery and the inner periphery, and
  wherein the profile feature is on the face that is concealed in use.

20. The escutcheon or wall flange as claimed in claim 19, comprising, as a unitary component, the outer ring-shaped region with a circular inner periphery and one or more concentric ring-shaped inner regions within said circular inner periphery,
  wherein said ring-shaped inner region(s) are detachable from the outer ring-shaped region of the moulding and/or are detached independently of more outward ring-shaped inner regions.

21. The escutcheon as claimed in claim 20, wherein said escutcheon comprises two or more inner ring-shaped regions, each being a concentric sacrificial zone, each of which is able to be torn away independently of other more outward sacrificial zones.

22. The escutcheon as claimed in claim 20, wherein the, or each, inner ring-shaped region, or sacrificial zone, is reinforced by the profile feature.

23. The escutcheon as claimed in claim 20, wherein the outer ring-shaped region is reinforced by one or more profile features.

24. The escutcheon as claimed in claim 20, wherein said inner ring-shaped region(s) is/are demarcated from one another and/or from the remaining portion of the escutcheon by a perforated or otherwise weakened zone of material.

25. The escutcheon as claimed in claim 1, wherein said profile feature limits deflection of the flexible inner ring-shaped region in the axial direction.

\* \* \* \* \*